United States Patent [19]

Richardson et al.

[11] Patent Number: 5,365,137
[45] Date of Patent: Nov. 15, 1994

[54] ELECTRIC MOTOR

[75] Inventors: Lyman Richardson, Thornhill; Wojciech Mizera, Downsview, both of Canada

[73] Assignee: Dynamic Systems International Inc., Concord, Canada

[21] Appl. No.: 51,803

[22] Filed: Apr. 26, 1993

Related U.S. Application Data

[63] Continuation of Ser. No. 609,693, Nov. 1, 1990, abandoned.

[51] Int. Cl.$^5$ .............................................. H02K 1/12
[52] U.S. Cl. ...................... 310/258; 310/42; 310/112; 310/156; 310/179
[58] Field of Search ................ 310/89, 258, 254, 259, 310/216, 218, 112, 114, 64, 261, 265, 91, 42, 156, 179

[56] References Cited

U.S. PATENT DOCUMENTS

| | | | |
|---|---|---|---|
| 1,485,533 | 3/1924 | Sammarone | 310/258 |
| 2,982,873 | 5/1961 | Simmons et al. | 310/218 |
| 3,021,444 | 2/1962 | Simmons et al. | 310/218 |
| 3,047,755 | 7/1962 | Angst et al. | 310/261 |
| 3,244,919 | 4/1966 | Drenth et al. | 310/261 |
| 3,246,187 | 4/1966 | Iemura | 310/261 |
| 4,636,668 | 1/1987 | Nikaido | 310/259 |
| 5,200,662 | 6/1993 | Tagami | 310/156 |
| 5,208,498 | 5/1993 | Hamajima | 310/156 |

*Primary Examiner*—R. Skudy
*Attorney, Agent, or Firm*—Mirek A. Waraksa

[57] ABSTRACT

A modular, expandable, low-weight electric motor has a cylindrical, non-magnetic casing formed in axially-aligned sections. The casing sections are releasably connected to define a unitary structure with a polygonal exterior surface and a circular interior surface. Separate U-shaped stator pole assemblies are releasably mounted against the exterior of the casing, each casing section carrying the poles associated with a different motor phase. The poles extend through apertures into the interior of the casing, and have active pole faces which are curved and substantially flush with the circular interior surface of the casing. A modular rotor is mounted in the interior of the casing and carries magnetic elements in axially spaced-apart sets corresponding to each motor phase. The active faces of the magnetic elements are curved and oriented in a cylindrical arrangement. During each rotation of the rotor, the pole faces of each motor phase simultaneously and repeatedly register with the associated magnetic element faces forming air gaps, and the magnetic elements simultaneously complete local magnetic circuits with each stator pole assembly. The sets of magnetic rotor elements are indexed circumferentially relative to one another such that the motor is self-starting.

8 Claims, 8 Drawing Sheets

ELECTRIC MOTOR

This is a continuation of co-pending application Ser. No. 07/609,693, filed Nov. 1, 1990, now abandoned.

FIELD OF THE INVENTION

The invention relates generally to the construction of electric motors, and has specific application to the construction of switched reluctance motors.

BACKGROUND OF THE INVENTION

Prior switched reluctance motor generally comprise a housing which contains a number of stator poles wound with electromagnetic coils and a rotor with complementary components. The stator poles are often integrally formed with or very much a part of the motor's support structure, the support structure being required to complete the magnetic flux paths between stator poles and rotor components that are necessary for production of motor torque. This precludes any extensive use of light-weight, non-magnetic materials. A significant mount of heat is generated within the motor housing, and steps must be taken to generate and direct air flows through the interior of the motor housing to dissipate heat, particularly in the windings and stator poles. These factors complicate manufacture of a motor and add considerably to cost, size and weight. Since requirements for back-iron and cooling increase significantly with the number of motor poles, it is comparatively rare for a commercial switched reluctance motor to be manufactured with six or more poles.

The stator poles and complementary rotor elements of a switched reluctance motor will normally have a different pitch. The general object is to ensure that one stator pole always overlays one rotor element so that a motor torque initiating rotor rotation can at any time be generated. The natural consequence of such an arrangement is relatively low torque during start-up under loads. To compensate for inherent low starting torques, manufacturers will normally oversize a motor relative to steady-state torque requirements. This further contributes to excessive weight and cost, and also to poor motor efficiency during steady-state operation. Motor efficiency is further reduced by requiring long magnetic flux paths through motor support structure.

The basic motor geometry necessary to ensure self-starting creates additional problems. In steady-state operation only one pole in most commercially available switched reluctance motor can be energized to produce a motor torque. This results in considerable torque ripple, especially given the limited number of poles commonly associated with such a design. This arrangement also produces localized and unbalanced forces in the motor housing and support structure, which must be accommodated with a more robust support structure, further contributing to the weight of the motor.

Lastly, many prior switched reluctance motors involve commutators or slip rings. Such components further complicate manufacture and add to the cost of a motor. Also, these components are subject to excessive wear and tend to require periodic maintenance.

BRIEF SUMMARY OF THE INVENTION

In one aspect, the invention provides an electric motor which has a generally cylindrical casing. A multiplicity of separate stator pole assemblies including coil means are mounted on the exterior of the casing with associated stator poles extending through apertures into the interior of the casing. The stator pole assemblies are circumferentially spaced about the exterior surface of the casing, and the pole faces associated with the stator poles are oriented in a cylindrical arrangement with a predetermined radius. A rotor is mounted in the interior of the casing, and has a rotational axis centered in the cylindrical arrangement of pole faces. A multiplicity of magnetic elements are supported on the rotor and spaced-apart circumferentially. Faces of the magnetic elements are oriented in a cylindrical arrangement with a radius smaller than that of the cylindrical arrangement of pole faces by a predetermined amount. During each rotation of the rotor, the pole faces and the multiplicity of stator pole assemblies simultaneously and repeatedly register with the element faces to form at each pole face an air gap having a radial dimension corresponding to the predetermined mount. As the air gaps are formed, the magnetic elements complete a local magnetic circuit with each of the stator pole assemblies, the local magnetic circuit comprising the magnetically-coupled stator poles of the associated stator pole assembly, the air gaps formed at the pole faces of the stator pole assembly, and the magnetic element or elements defining the air gaps with the pole faces.

There are several advantages associated with this motor configuration. The stator poles are provided as separate assemblies conveniently mounted on the exterior of the casing thereby significantly simplifying motor assembly. The external mounting of the stator assemblies avoids the need for special measures to direct air flows through the interior of the motor to dissipate heat. Since there is no dependence on stator supporting structures to complete magnetic circuits necessary for motor action, there is freedom to form the casing and other support structure of light-weight, non-magnetic materials, such as aluminum alloys. As will be apparent from preferred embodiments described below, such a motor can be very conveniently provided with a comparatively large number of stator poles without drastic increases in size, weight and complexity of manufacture and assembly.

It is also possible in such a motor to activate all the stator poles simultaneously for purposes of generating motor torque. This permits a comparatively smaller and lighter motor to achieve required operating torques. This arrangement also results in a relatively symmetric or balanced reaction of motor torques into the motor casing thereby reducing the structural requirements of the casing. To provide self-starting, the motor can be formed with at least two phases, but preferably at least three phases, configured such that at least one phase is at any given time capable of generating a torque to initiate rotation of the rotor. The capacity for simultaneous actuation of a number of stator poles during start-up under heavy loads avoids the need for excessive oversizing of a motor and attendant inefficiency.

In other aspects of the invention, principal components of a motor such as the casing, stator or rotor are provided with essentially a modular construction. The casing can be constructed very advantageously in sections which can be releasably coupled to define a unitary casing whose size corresponds to the number of motor phases required. Stators of various size are constructed of separate stator pole assemblies which releasably mount on the exterior of such a motor casing. In a still further aspect of the invention, a motor configuration is provided such that the motor can be readily expanded to include additional motor phases.

Other aspects of the invention and associated objects and advantages will be apparent from a description of preferred embodiments below and will be more specifically defined in the appended claims.

DESCRIPTION OF THE DRAWINGS

The invention will be better understood with reference to drawings illustrating preferred embodiments of the invention in which.

DESCRIPTION OF PREFERRED EMBODIMENTS

Figure 1:
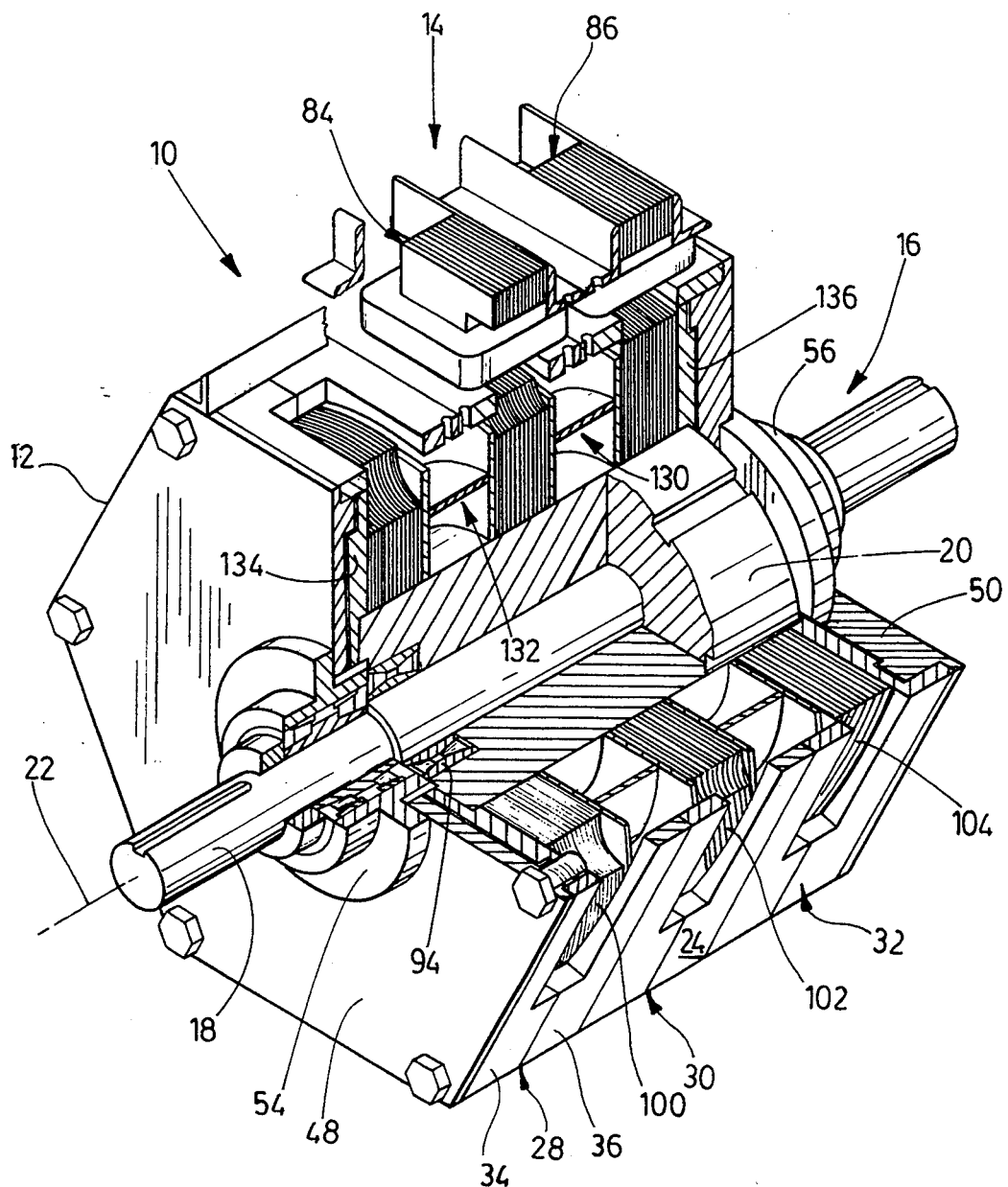
FIG. 1 is a fragmented perspective view of an electric motor.
Figure 2:
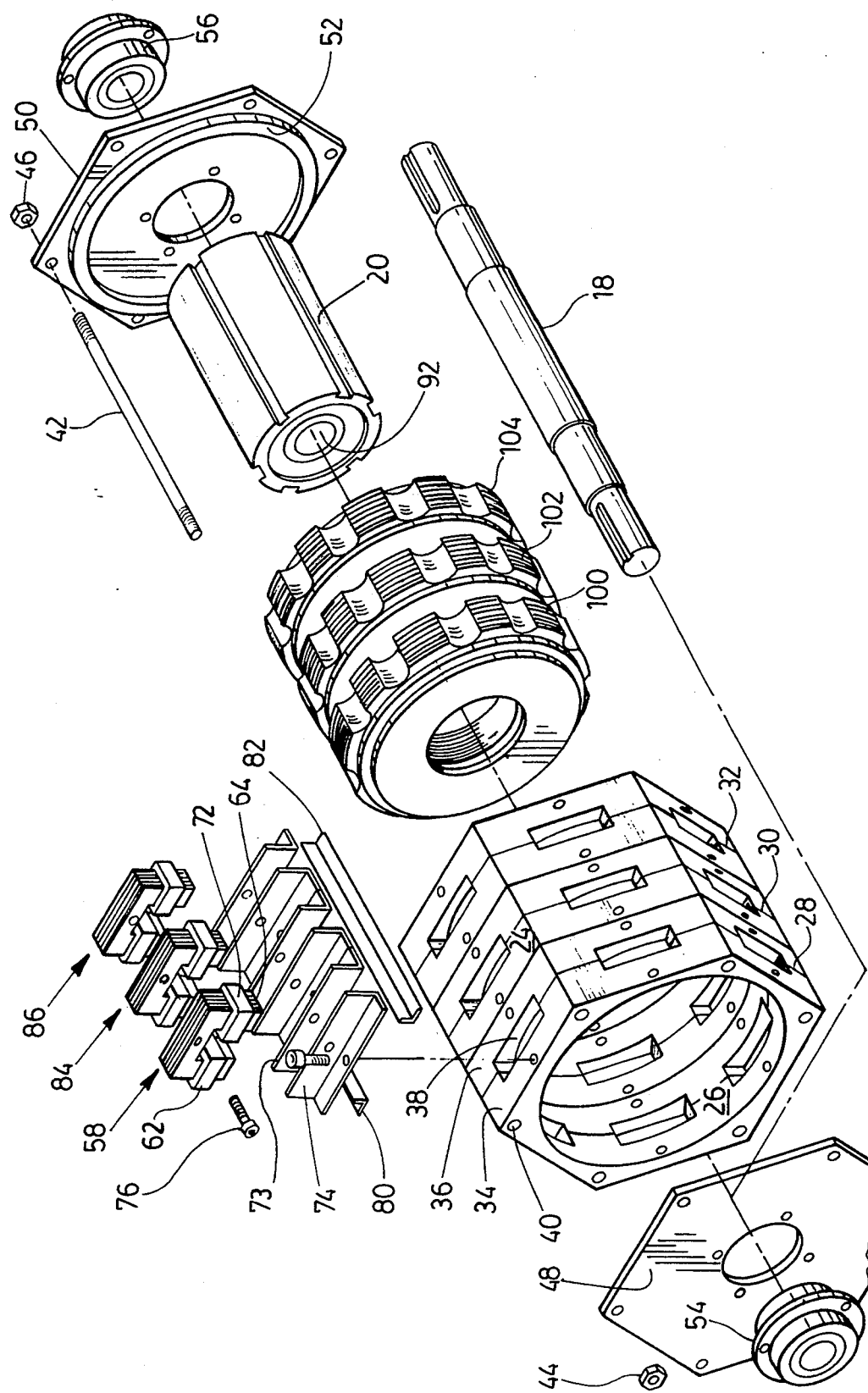
FIG. 2 is an exploded perspective view of various components of the motor of FIG. 1.

Reference is made to FIGS. 1-4 which illustrate a three-phase electric motor 10. The principal components of the electric motor 10 will be apparent in the views of FIGS. 1 and 2. These include a generally cylindrical casing 12, a stator 14 formed by a multiplicity of separate stator pole assemblies on the exterior surface 24 of the casing 12, and a rotor 16. The rotor 16 comprises an output shaft 18 and a support member 20 which carries magnetic elements. The central longitudinal axis 22 of output shaft 18 constitutes the rotational axis of the rotor 16.

The casing 12 is formed of a light-weight, non-magnetic material, which is preferably aluminum or an aluminum alloy. The electromagnetically active elements of the stator 14 and rotor 16 are formed of motor iron, which will typically have a higher specific mass. The exterior surface 24 of the casing 12 has a regular (that is, equal-sided) polygonal shape in cross-section perpendicular to the axis 22. In the present embodiment, the casing 12 is hexagonal in external shape with six flat sides. The interior surface 26 of the casing 12 has a generally circular shape in cross-section perpendicular to the axis 22. This unusual configuration facilitates the mounting of stator pole assemblies, as described more fully below.

The casing 12 has a modular construction involving three identical casing sections 28, 30, 32 which are axially-aligned and abutted. The number of casing sections corresponds to the number of motor phases, each casing section supporting the stator pole assemblies associated with a different one of the motor phases and housing within its interior the rotor elements which co-act with the stator pole assemblies of the associated motor phase.

The casing section 28 is typical. It is constructed of two identical cylindrical parts 34, 36, each part have six exterior sides in a regular hexagonal arrangement and a pair of axially opposing end surfaces. One of the end surfaces of each part is formed with six recesses, each recess positioned centrally at a different one of the exterior sides. The recessed end surfaces of the two parts 34, 36 are abutted (as in FIGS. 1 and 2) to define the casing section 28, and the recesses of the two parts 34, 36 meet to define an aperture at each side of the casing section 28, such as the aperture 38. The casing sections 28, 30, 32 are formed with six longitudinal passages, such as the passage 40, which are aligned axially when the casing sections 28, 30, 32 are abutted and oriented to define the six flat exterior sides of the casing 12. Six rods with threaded ends and six pairs of nuts (such as the rod 42 and the two nuts 44, 46) are used to releasably secure the casing sections 28, 30, 32 to define essentially a unitary structure. The advantage of this particular casing configuration is that a single type of casing components, such as the part 34, can be manufactured to construct a motor casing of any required axial size.

A pair of opposing end plates 48, 50 close the cylindrical casing 12. These have a hexagonal periphery conforming in dimension to the exterior surface 24 of the cylindrical casing 12. The six threaded rods which join the sections of the cylindrical casing 12 also serve to secure the end plates 48, 50 to the cylindrical casing 12. The end plate 50, which is typical, has a circular shoulder 52 on its inside face, dimensioned to seat closely within the circular interior of the cylindrical casing 12. Each end plate has a central opening, and a pair of bearings 54, 56 seated in the openings serve to support opposing ends of the rotor output shaft 18.

The stator pole assembly 58 is typical, and constitutes a modular component for construction of the stators. It comprises a generally U-shaped member 60 formed of magnetic material (motor iron), laminated to reduce the formation of eddy currents. The U-shaped member 60 has a pair of legs which constitute poles 62, 64 of the assembly, and a cross-bar 65 which magnetically couples the stator poles 62, 64. The stator poles 62, 64 extend through the aperture 38 into the interior of the casing 12, and are terminated with or define a pair of pole faces 66, 68. The pole faces 66, 68 are curved according to the radius of curvature of the interior surface 26 of the casing 12 and are for practical purposes mounted flush with the interior casing surface 26. Coils 70, 72 are located about the stator poles 62, 64 and can be electrically energized to induce a magnetic flux in the associated stator pole and more generally in the stator pole assembly. A single coil wound about the cross-bar 65 would be satisfactory, as in the second embodiment of a motor described below.

Each stator pole assembly is conveniently mounted on the exterior surface 24 of the casing 12 in a similar manner. The stator pole assembly 58 is once again typical and mounting details are apparent in FIGS. 2 and 3. A bracket assembly is provided which comprises two angle-brackets 73, 74 which engage opposing sides of the U-shaped member 60. The two angle-brackets 73, 74 and the cross-bar 65 have openings which register to permit attachment of the brackets to the pole assembly by means of a bolt 76 and nut (not illustrated). The bracket assembly includes two additional angle-brackets 80, 82 which serve as spacers and have flat bottom surfaces which are mounted flush against the flat side of the casing 12. The result is that the stator pole assembly is entirely external to the casing 12 except for end portions of the poles 62, 64 which extend into the interior of the casing 12. It will be apparent from the drawings that the pole faces of the stator pole assemblies of all three phases are in a generally circular cylindrical arrangement, that is, they tend to lie on a hypothetical circular cylindrical surface. In this embodiment, the hypothetical cylindrical surface is substantially coincident with the interior surface 26 of the 12, and the radius of the cylindrical arrangement corresponds to the radius of the interior casing surface 26.

Figure 3:
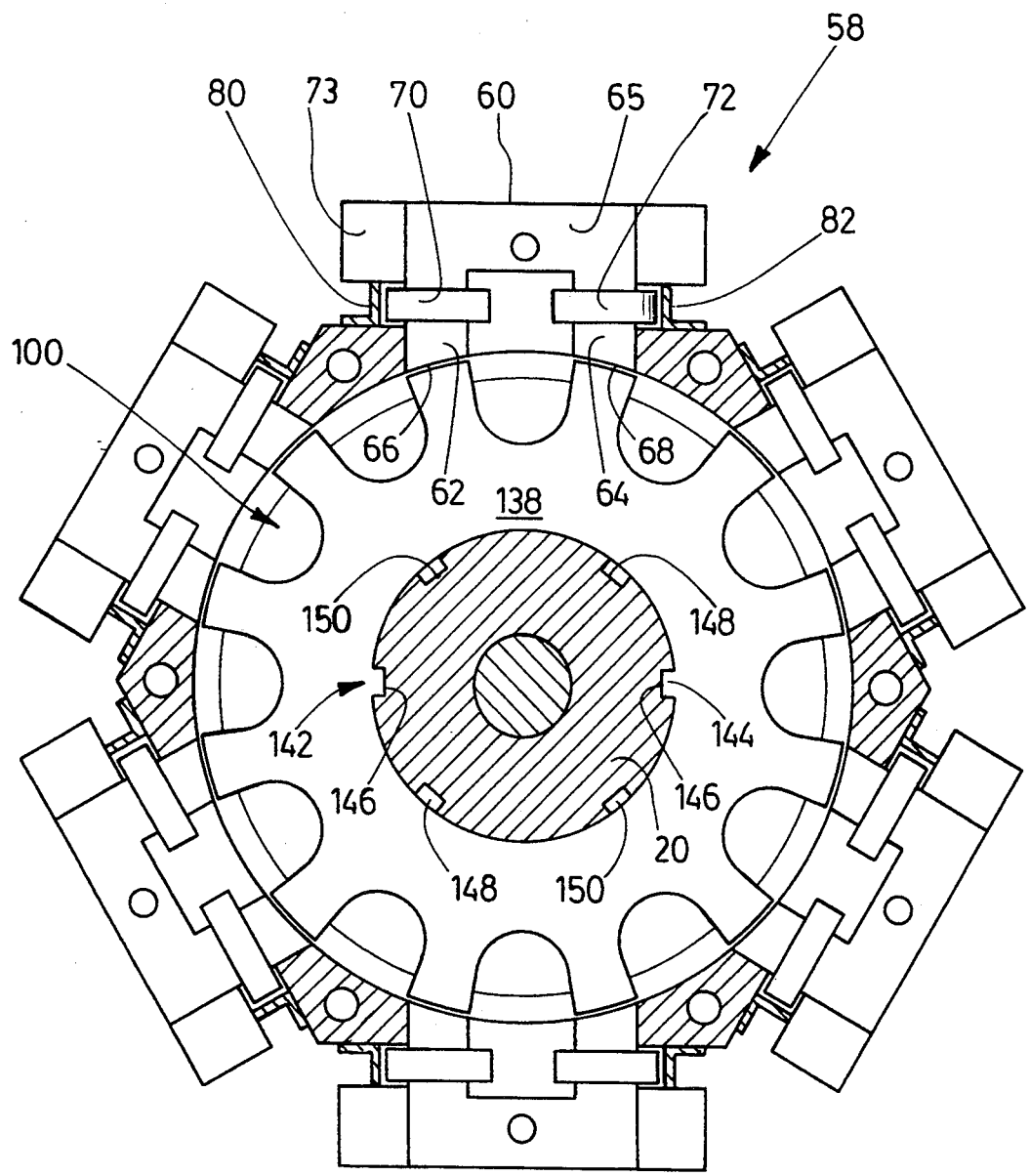
FIG. 3 is a cross-sectional view of the motor of FIG. 1 in a plane perpendicular to the rotational axis of the associated rotor.

In each phase, the U-shaped members of the associated stator pole assemblies are aligned in a common hypothetical plane perpendicular to the axis 22 (substantially the plane of FIG. 3). The stator pole assemblies of each phase are equally spaced circumferenfially, and the pole faces are in fact equally-spaced circumferentially by a common predetermined angle, namely, 30 degrees. It will also be noted that each U-shaped member of each motor phase is axially in registration with another U-shaped member in each of the other motor phases. For example, the stator pole assemblies 58, 84, 86 of the three motor phases exhibit axial registration (see FIG. 4).

The support member 20 of the rotor 16 is preferably formed of a light-weight, non-magnetic material such as aluminum or an aluminum alloy. The support member 20 has a central longitudinal passage 92 which receives the rotor output shaft 18. It is releasably mounted for rotation with the rotor output shaft 18 by a pair of cylindrical friction elements, such as the element 94 apparent in FIG. 1. The support member 20 has a generally cylindrical outer surface which is formed with six longitudinal open-ended grooves.

Three generally annular, toothed members 100, 102, 104 formed of magnetic material (motor iron) are mounted on the support member 20. Each toothed member has a central aperture which receives the support member 20. Each is formed with twelve peripheral teeth, which are equally spaced-apart circumferentially by the same predetermined angle of 30 degrees associated with the spacing of the stator pole faces of each motor phase. The outer faces of the teeth are curved according to a radius of curvature corresponding to the radius of the casing's interior surface 26 less a predetermined mount in the range of 0.25 mm to 1 mm. The outer faces of all teeth are oriented in a cylindrical arrangement having a radius which is once again the radius of the inner cylindrical casing surface less the predetermined amount. The predetermined amount consequently corresponds to the radial size of the air gaps which will occur between the teeth and the stator poles when registered during rotation of the rotor 16.

The relationship between the stator pole faces of the first phase and the teeth of the first toothed member 100 will be apparent with reference to FIG. 3. The number of stator pole faces corresponds to the number of teeth on the toothed member 100. The common pitch angle of the pole faces and the teeth ensures that during each rotation of the rotor 16 the pole faces and radially outer faces of the teeth simultaneously register as shown in FIG. 3. This registration occurs repeatedly during each revolution, namely twelve times corresponding to the number of pole faces and teeth. As outer surfaces of the teeth register with the stator pole faces, an air gap having a radial extent corresponding to the predetermined amount is formed simultaneously between each pole face and a different one of the teeth of the rotor 16.

Those skilled in the art will appreciate that the coils associated with the stator pole assemblies will be energized electrically just as the air gaps are forming to produce a motor torque and would be de-energized prior to reaching the fully registered state apparent in FIG. 3. A similar relationship is observed by the pole faces and radially outer faces of the teeth in the other two motor phases. Accordingly, all stator pole assemblies can be energized a total of twelve times during each revolution to generate motor torque. Because of the large number of poles associated with each phase, this permits generation of fairly substantial torques even a low speeds or at start-up.

Figure 4:
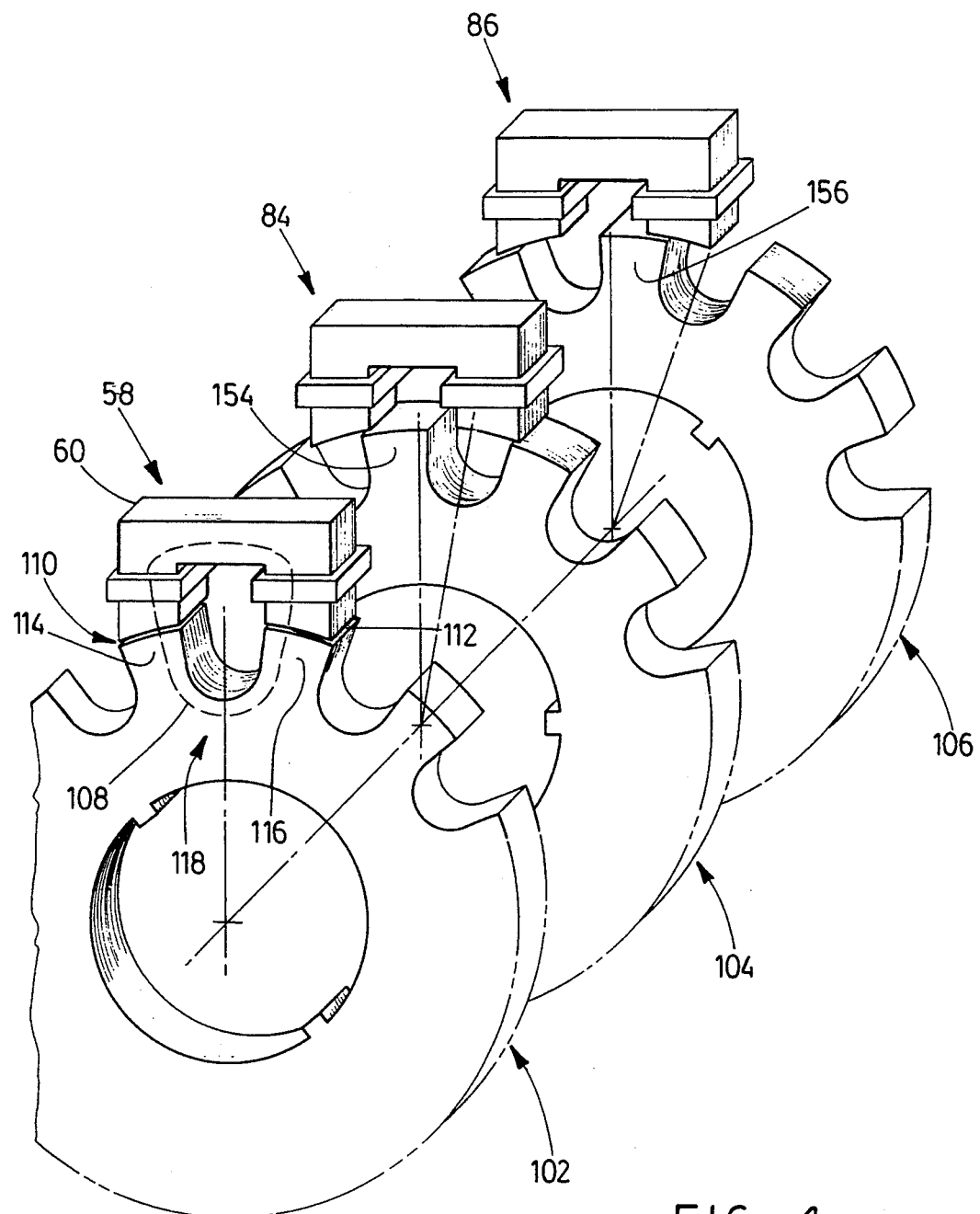
FIG. 4 is a perspective view of rotor and stator elements of the motor of FIG. 1 showing how the rotor components are indexed circumferentially between stages to provide self-starting.

The arrangement of the stator poles and rotor teeth results in the formation of local magnetic circuits at each of the stator pole assemblies as the relevant air gaps are formed. Referring to FIG. 4, a local magnetic path 108 associated with a stator pole assembly 58 has been indicated with phantom lines. The circuit comprises the two poles 62, 64, the air gaps 110, 112 formed at the pole faces 66, 68, and the two teeth 114, 116 which serve to define the air gaps 110, 112 associated with the particular stator pole assembly. The poles 62, 64 are of course magnetically coupled by the cross-bar 65, and the two teeth 114, 116 are magnetically coupled by adjoining magnetic material 118. The cylindrical casing 12 serves only structural functions, supporting the stator poles and reacting motor torques, but is not required to complete magnetic circuits involving the stator poles. Accordingly, the casing 12 can be formed of a light-weight non-magnetic material such as aluminum, plastic or any other suitable material. The formation of localized magnetic circuits minimizes the length of required magnetic paths thereby reducing power losses.

The toothed rotor members are constructed of a multiplicity of identical annular plates of magnetic material (motor iron). These are separated into three sets of plates in axially side-by-side relationship by annular spacers 130, 132, (apparent in FIG. 1) centrally apertured to receive the support member 20. Each set of plates defines one of the toothed rotor members, the spacers 130, 132 separating the sets such that each of toothed members 100, 102, 104 is located within a different one of the three casing sections 28, 30, 32. A pair of end spacers 134, 136 (apparent in FIG. 1) serves to secure the arrangement.

An outer plate 138 associated with the toothed member 100 is typical and apparent in the view of FIG. 3. The plate 138 has a central opening which receives the support member 20 and a multiplicity of radially-outwardly extending tabs which are equally spaced-apart circumferentially. These tabs serve when registered with similar tabs on the other plates to define the teeth of the toothed member 100. The plate 138 also has a pair of diametrically opposing tabs 142, 144 which extend radially inwardly into a paired set of diametrically opposing grooves 146 associated with the support member 20, this arrangement serving to connect the plate 138 to the rotor output shaft 18.

The six grooves of the support member 20 are effectively divided into three two-groove sets. All plates of the first toothed member 100 have tabs located in the set of grooves 146 as mentioned above. During assembly, the tabs of the various plates are simply inserted into the grooves and slid along the support member 20 to define the first toothed member 100. Spacer 132 can then be installed. A second set of plates are then installed with the internal tabs located in a paired set of grooves 148. The second spacer 130 may then be installed. The last set of plates is installed with internal tabs in the grooves 150. End spacers 134, 136 serve to retain the resulting structure.

The relative circumferential spacing of the sets of grooves should be noted. Each set is offset relative to the circumferentially succeeding set by 50 degrees (60 degrees less an indexing factor of 10 degrees). This results in each toothed member being indexed relative to the other two motor phases by a fraction (one-third) of the common spacing angle between the teeth. The overall effect is apparent in FIG. 4. For example, the tooth 114 associated with the first motor phase is fully registered with the stator pole 62. A corresponding tooth 154 in the second phase is indexed clockwise by 10 degrees. The corresponding tooth 156 in the third phase is indexed clockwise relative to the tooth 114 of the first toothed member 100 by two-thirds of the common angle, namely, 20 degrees. The result is that the teeth of one of the toothed members 100, 102, 104 will at any instance be positioned for generation of torque tending to rotate the rotor 16 if the coils associated with the particular phase are energized. In FIG. 4, the teeth of the third phase are so positioned (assuming clockwise rotation of the rotor 16). In a multiphase motor embodying the basic design, it is possible to provide self-starting with only two phases, but in practice it is preferable that at least three phases observe the indexing arrangement just described to ensure proper self-starting. It will be apparent that since twelve poles of one phase will be positioned for start-up of the motor 10 a fairly substantial starting torque can be developed, unlike many prior motors, and that no substantial oversizing of the motor 10 is required to accommodate start-up under load.

The motor 10 will be seen to embody modular construction principles. The cylindrical motor casing can be built up to any required axial dimension from a number of releasably connected casing sections. Whatever number of stator poles are required can be conveniently provided by releasably securing individual and separate stator pole assemblies at the apertures associated with each of the casing sections. The external mounting of the poles not only facilitates cooling, but also reduces the amount of labor required to assemble a stator to an extent which has not heretofore been possible with prior motor designs. The rotor 16 itself has a modular construction, the basic building units being identical annular plates and spacers. This construction has the notable advantage, not characteristic of prior motors, that an existing motor can be very readily expanded to add additional motor phases if required by a user. This simply involves adding additional casing sections, additional stator pole assemblies, and additional rotor plates and spacers. The principal components which must be changed are the rotor output shaft 18 and the support member 20, both of which would have to be lengthened. The support member 20 might be provided with additional sets of paired grooves to accommodate the additional phases and to provide a relative measure of indexing between each phase. This is desirable to further reduce torque ripple, but is by no means critical. For example, the same set of six grooves could be retained and the additional phases could be aligned with the first, second and third phases. A consideration which may limit expansion of an existing motor is possible flexing of the rotor shaft 18.

Figure 5:
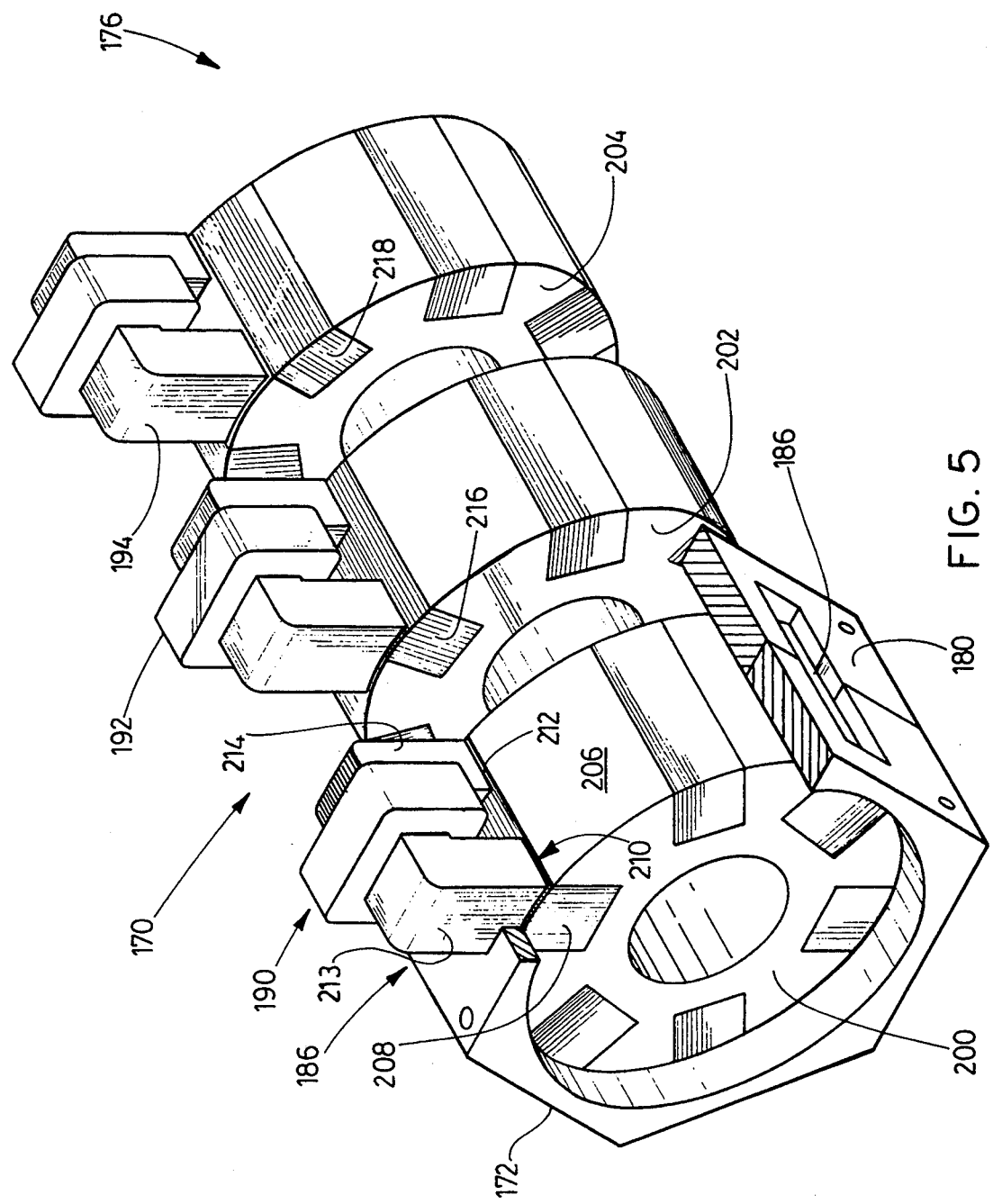
FIG. 5 is a diagrammatic perspective view illustrating the principal components of a second embodiment of an electric motor.

FIG. 5 illustrates a second three-phase motor 170 embodying the invention. Only those components necessary to understand how magnetic circuits are formed in the motor 170 and how self-starting is provided have been illustrated. The motor 170 may be seen to comprise a generally cylindrical casing 172, a multiplicity of stator pole assemblies, and a rotor 176. The output shaft of the rotor has not been illustrated, but would be mounted to the casing 172 for rotation in substantially the same manner as the rotor output shaft 18 is mounted.

The cylindrical casing 172 is substantially identical to that described above. It is formed of three axially-aligned, two-part casing sections (only one typical casing section 180 being illustrated). Each casing section once again corresponds to one of the three motor phases, the section 180 corresponding to the first motor phase. Each casing has an exterior surface with six sides in a regular hexagonal configuration as viewed in cross-section perpendicular to the rotational axis. Each side of each casing section is formed with one aperture or slot, such as the aperture 186 of the casing section 180. These apertures are aligned with the rotational axis to receive stator pole assemblies oriented generally parallel to the motor's rotational axis. Six stator pole assemblies would be associated with each phase and would be mounted with appropriate brackets one to each side of the casing sections as in the first embodiment of the motor 10.

A stator pole assembly 190 of the first phase is typical. As apparent in FIG. 5, the stator pole assembly 190 lies in a plane containing the rotational axis of the rotor 176. The other stator pole assemblies (not illustrated) of the first phase are similarly oriented relative to the rotational axis of the rotor 176, circumferentially in registration with one another, and equally-spaced circumferentially by a predetermined angle, namely, 60 degrees. The stator assemblies of the second and third motor phases are similarly configured.

It should be noted that one stator pole assembly of each phase is axially aligned with a stator pole assembly of either of the other two phases. The stator pole assemblies 190, 192, 194, respectively belonging to the first, second and third motor phases, are exemplary of this axial alignment. The pole faces defined by the stator pole assemblies of the three phases are once again in a cylindrical arrangement having a radius corresponding to that of the inner circular cylindrical surface of the casing 172. The pole faces are curved according to the radius of curvature of the inner casing surface and are mounted for practical purposes flush with that surface. The principal difference with respect to the motor 10 is that the stator poles of each phase are now in two axially spaced-apart rings, rather than a single ring in a single common plane.

The rotor 176 has a portion which supports magnetic elements which co-act with the stator poles. This support portion is constructed as three separate support members 200, 202, 204 which are axially aligned. Each member has a central passage which receives the motor output shaft (not illustrated). Each support member carries the magnetic rotor elements associated with a different one of three motor phases. The support member 200, which is typical, is formed of a block of aluminum. It has a cylindrical outer surface 206 formed with six longitudinal recesses each containing a laminated bar of magnetic material (motor iron) secured to the support member 200 by means of screws. The bars are equally spaced-apart circumferentially by the same angle as the stator pole assemblies and are in registration circumferentially. The magnetic bar 208 which is typical has a sufficient axial length that its outer face can simultaneously form air gaps 210, 212 with both poles 213, 214 of the stator pole assembly 192. As these gaps 210, 212 are formed, the magnetic bar 208 completes a local magnetic circuit with the stator pole assembly 192. That magnetic circuit comprises the two poles of the assembly 192, the air gaps 210, 212, and the bar 208. The outer pole faces are curved according to the radius of curvature of the inner cylindrical surface of the casing 172 less a predetermined amount corresponding to the expected radial size of the air gaps to be formed. It will be appreciated that, as with the first embodiment of the motor 170, similar air gaps and magnetic circuits are simultaneously formed at each of the stator pole assemblies by a different one of the rotor bars. This occurs six times during each rotation of the motor 170. Accordingly, the twelve stator poles of each phase can be energized simultaneously and repeatedly to produce a motor torque thereby providing considerable motor action, relatively little torque ripple and even reaction of forces circumferentially around the casing 172.

The magnetic bars associated with the support members 202, 204 of the second and third phases are identically oriented. However, the sets of bars of each additional motor phase are indexed circumferentially relative to the bars of the first phase by a fraction of the common angle separating the magnetic elements. In FIG. 5, the magnetic bar 208 of the first phase is shown fully registered with the poles of the stator assembly 190. The corresponding magnetic bar 216 of the second phase is indexed by 10 degrees clockwise, and the corresponding bar 218 of the third phase, by 20 degrees. Accordingly, at any given time, the stator poles and magnetic bars of at least one phase will be oriented for production of a motor torque when the associated coils are energized. In the orientation of FIG. 5, the second phase is currently so oriented (assuming clockwise rotation), as viewed from the right side of FIG. 5.

It will be noted that in both the first and second motors 10, 170 there is an axial alignment of the stator pole assemblies between the three phases. Relative circumferential indexing of the rotor elements is used in both motors to provide self-starting thereby eliminating the need for a starter motor. The stator pole assemblies might instead be indexed circumferentially for such purposes with the magnetic elements (teeth or bars) axially aligned between phases; however, the overall axially-aligned arrangement of stator poles in the two motors is preferred as this provides a uniformity in the construction of the casing, particular in the location of the apertures required to mount the stator poles. This is particularly significant if the casing is to have a regular polygonal shape, which is singularly advantageous for external mounting of the poles. Indexing of the stator pole assemblies on such a casing would unduly complicate the placement of the required apertures and the mounting of the stator pole assemblies.

The second motor 170 once again embodies modular construction principles. The casing 172 can be extended, as before, by providing a casing section for each phase required. Individual stator pole assemblies can be releasably mounted to the exterior of the casing 172 to form the stator section required for each phase. A separate rotor magnetic element support and set of magnetic bars can be provided for each motor phase as well. Basically, a motor can be built or an existing motor of this construction can be expanded by adding axially spaced-apart phases until a motor of required torque is achieved. The only major component which must of necessity be changed to create a larger motor or to expand an existing motor is the rotor output shaft.

Figure 6:
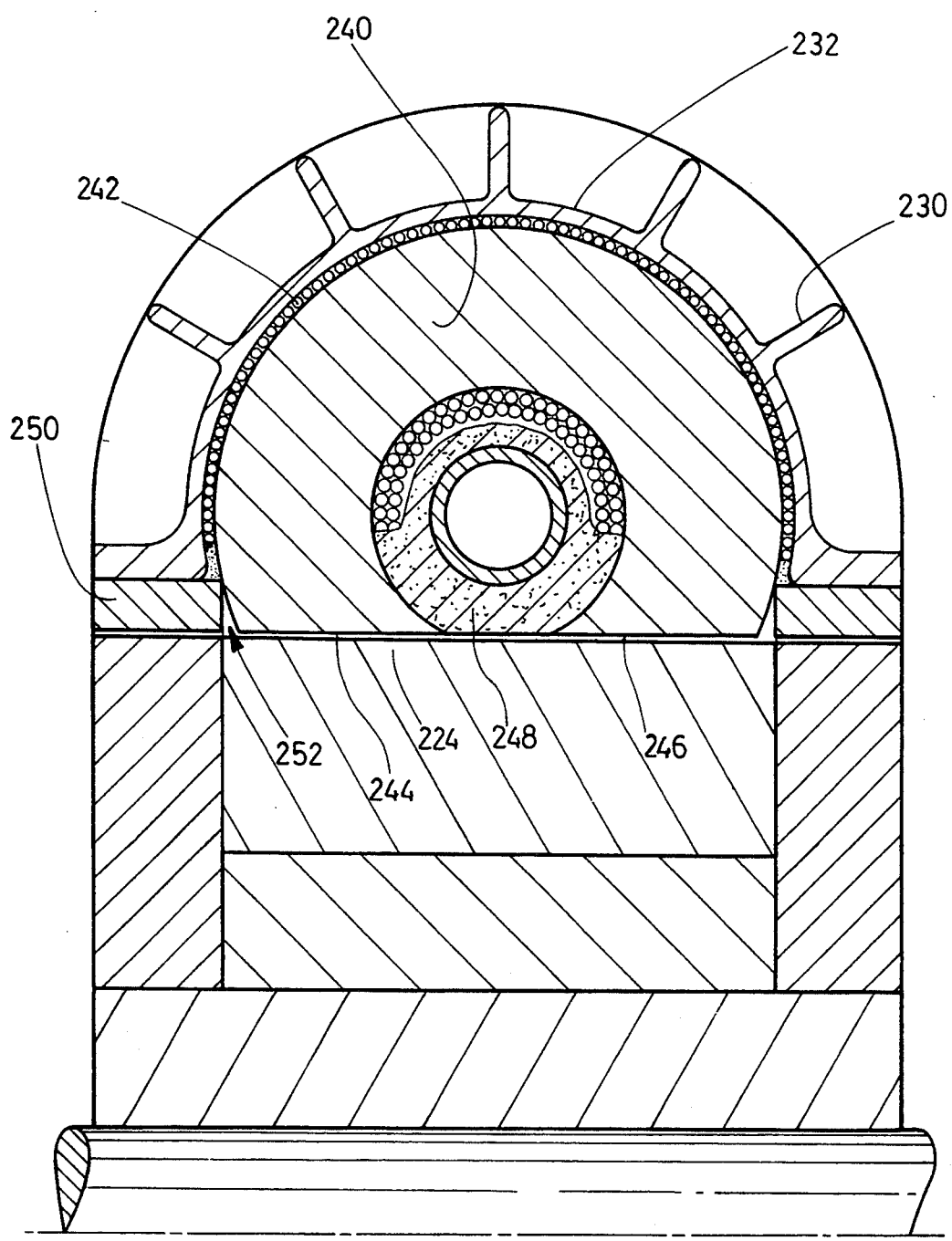
FIG. 6 is a cross-sectional view illustrating a housing and stator pole assembly appropriate for external mounting of the assembly on a support casing.
Figure 7:
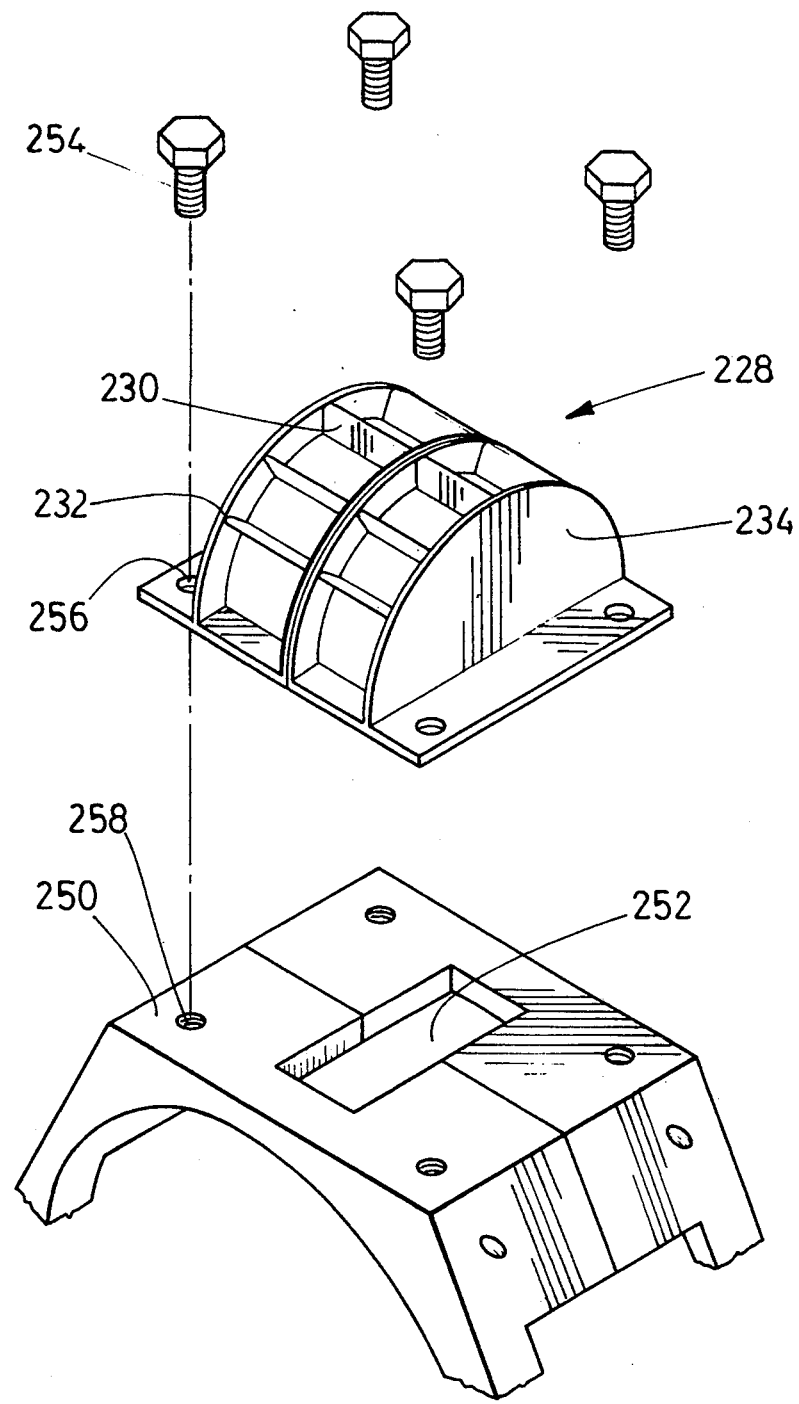
FIG. 7 is an exploded and fragmented view of the housing and stator pole assembly of FIG. 6; and, FIG. 8 is a schematic representation of control circuitry appropriate for operation of the motors.

FIGS. 6 and 7 show an alternative means for mounting stator pole assemblies on the exterior of a motor such as either of the motors 10, 170. The mounting means includes a housing 228 formed of a material having good heat conducting properties, such as aluminum or an aluminum alloy, and having fins (such as the fin 230) which provide a large heat radiating surface. The housing 228 is formed in two identical parts 232, 234 with central cylinder portions that mate when the housing sections are joined, but a two-part construction is not critical. The housing 228 encloses a U-shaped stator pole assembly 240 (in particular a part-toroidal shape). The assembly 240 has a single electromagnetic winding 242 for purposes of producing a magnetic flux in the associated pair of poles 244, 246. A heat-conductive potting compound 248, such as conventionally used to pot electronic circuits, fills the housing 228 and intimately contacts both interior surfaces of the housing 228 and exterior surfaces of the winding 242 and the stator poles 244, 246, placing the stator pole assembly 240 and the housing 228 in thermal communication and enhancing heat transfer to the housing 228. The housing 228 can be mounted flush against the flat external surface of a motor casing 250 with the poles 244, 246 extending through an aperture 252 formed in the casing, substantially as illustrated in FIG. 6 and releasably secured to the casing 250 with bolts, such as the bolt 254 shown in FIG. 7 aligned with an opening in housing 228 and a threaded opening 256 in the motor casing 250. The housing 228 and associated stator pole assembly 240 constitute a single unit which can be used in the fabrication of motor stators. The arrangement precludes introduction of contaminants through the aperture 252 into the interior of the motor, which may be particularly important in certain operating environments. It also protects the externally mounted stator pole assemblies and provides for proper heat dissipation, but avoids the introduction of an additional protective casing and means for drawing air flows through the protective casing.

Figure 8:
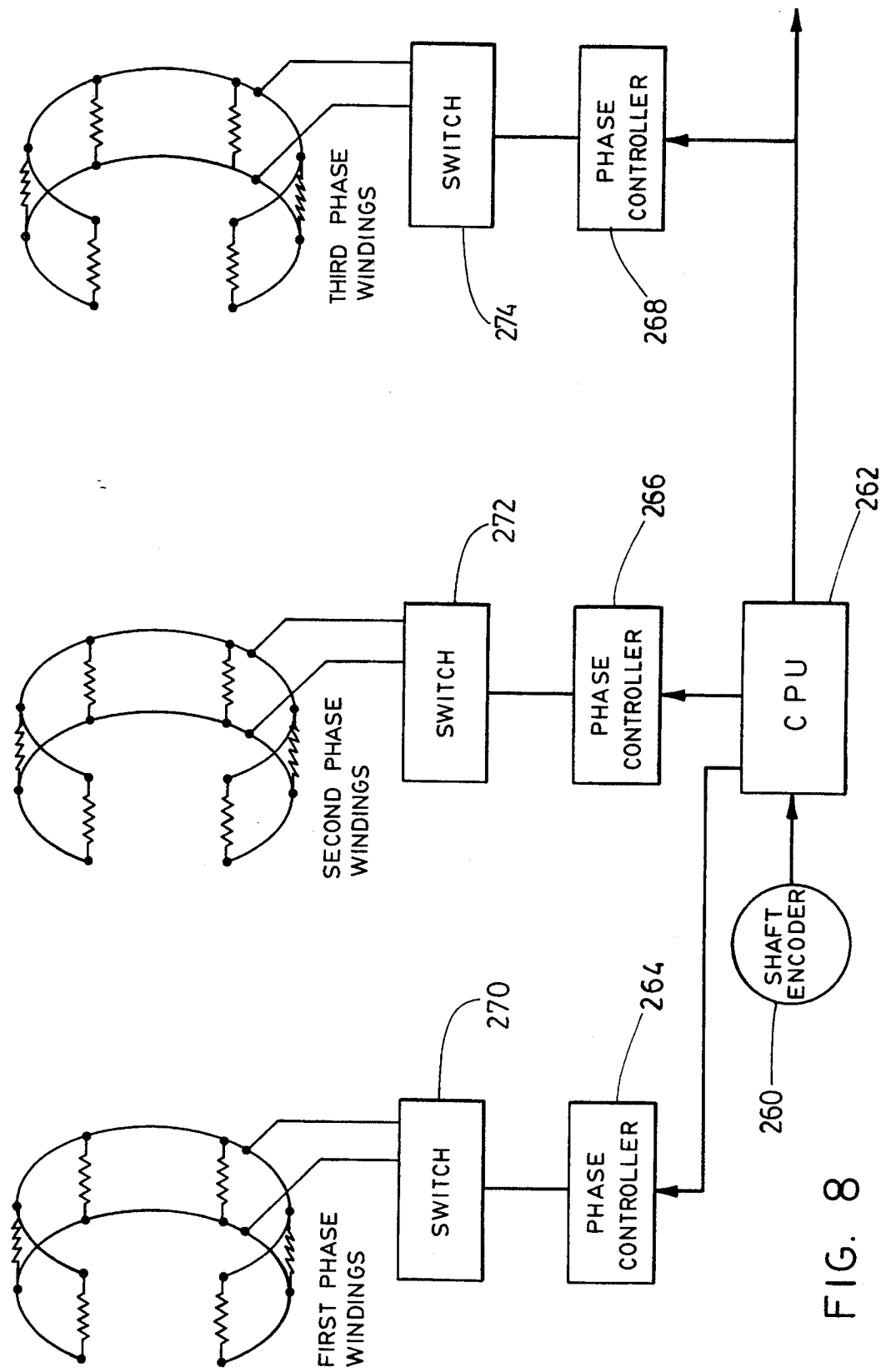

FIG. 8 shows a control circuit which can be used to operate either of the motors. Conventional switching principles are applicable to the motors, and accordingly only an overall schematic representation has been provided. In FIG. 8, the control circuitry is shown in association with the motor 10. This includes a shaft encoder 260 which produces a signal indicating the position of the rotor relative to the stator and from which the control circuitry can derive in a conventional manner timing data which determines when the stator assemblies of each phase should be energized. This signal is processed by a microprocessor (CPU) 262 and phase controllers 264, 266, 268 each associated with a different one of the motor phases. It is noteworthy that only three triac switches 270, 272, 274 are required, unlike the multiplicity of switches which are commonly associated with the most prior of switch reluctance motors. The switch 270 which is typical is operatively coupled to coils associated with each of the stator pole assemblies of the first phase. The switch 270 can be controlled in a conventional manner to initiate the application of current to these coils, this being done simultaneously for all coils in the particular phase. It will also be noted that no slip rings or commutators are required.

It will be appreciated that particular embodiments of the invention have been described and that modifications may be made therein without departing from the spirit of the invention or necessarily departing from the scope of the appended claims.

We claim:

1. In an electric motor comprising a casing having a central longitudinal axis and an interior, a rotor in the interior of the casing, and means supporting the rotor for rotation about the axis relative to the casing, the improvement in which:

the motor comprises a multiplicity of axially-aligned motor phases, each of the motor phases comprising:

A. a multiplicity of stator pole assemblies, each of the stator pole assemblies comprising a plurality of magnetically-coupled stator poles each having a pole face and comprising electrically-operable coil means for producing a magnetic field in each of the stator poles of the stator pole assembly;

B. means for releasably mounting each of the stator pole assemblies to the casing with the coil means of the stator pole assembly external to the casing and with the poles of the stator pole assembly extending into the interior of the casing through one or more apertures in the casing, the stator pole assemblies being spaced-apart circumferentially about the exterior surface of the casing with the pole faces of the stator pole assemblies oriented in a cylindrical arrangement with a predetermined radius; and, C. a multiplicity of magnetic elements mounted to the rotor and circumferentially spaced-apart, each of the magnetic elements having an element face, the element faces of the magnetic elements being oriented in a cylindrical arrangement with a radius smaller by a predetermined amount than the radius of the cylindrical arrangement of the pole faces of the stator pole assemblies, the element faces of the magnetic elements and the poles faces of the stator poles assemblies being arranged such that, during each rotation of the rotor, the poles faces of the stator pole assemblies simultaneously and repeatedly register with the element faces of the magnetic elements to form at each of the pole faces of the stator pole assemblies an air gap having a radial dimension corresponding to the predetermined amount and such the magnetic elements complete a local magnetic circuit with each of the stator pole assemblies whenever the air gaps are formed, the local magnetic circuit completed with each of the stator pole assemblies comprising the stator poles of the stator pole assembly, the air gaps formed at the pole faces of the stator pole assembly, and one or more of the magnetic elements which define the air gaps with the pole faces of the stator pole assembly;

the magnetic elements and stator poles assemblies of the motor phases being circumferentially oriented such that, at any time, at least one of the motor phases is capable of generating a torque to rotate the rotor when the coil means of the stator pole assemblies of the least one motor phase are electrically-energized.

2. The electric motor of claim 1 in which, in each of the motor phases:

each of the stator pole assemblies of the motor phase comprises a generally U-shaped member formed of magnetic material;

the U-shaped members of the stator poles assemblies of the motor phase are located in a common plane perpendicular to the axis; and, the pole faces of the stator pole assemblies of the motor phase are equally spaced circumferentially in the common plane.

3. The electric motor of claim 1 in which, in each of the motor phases:

each of the stator pole assemblies of the motor phase comprises a generally U-shaped member formed of magnetic material and located in a plane containing the longitudinal axis; and, the U-shaped members of the stator poles assemblies of the motor phase are in registration circumferentially and equally spaced circumferentially.

4. The electric motor of claim 1 in which:

the rotor comprises a support portion which has a generally cylindrical outer surface and sets of open-ended longitudinal grooves in its outer surface;

the rotor comprises a multiplicity of identical plates of magnetic material, each of the plates comprising a central opening which receives the support portion and inner tabs extending radially inwardly, each of the plates having a periphery formed with a multiplicity of outer tabs which extend radially outwardly and which are equally spaced circumferentially about the periphery;

the multiplicity of plates are arranged in sets in axially side-by-side relationship, each of the plate sets defining an annular member with peripheral teeth which are equally-spaced circumferentially by a common predetermined angle, the teeth of each of the annular members being associated with and constituting the magnetic elements of a different one of the motor phases;

each of the groove sets receives the inner tabs of each of the plates of a different one of the plate sets; and, the groove sets are circumferentially spaced such that the teeth associated with each one of the motor phases are indexed circumferentially by a fraction of the common predetermined angle relative to the teeth associated with each of the others of the motor phases.

5. The motor of claim 4 in which the stator poles assemblies of each of the motor phases are registered axially with the stator poles assemblies of each of the others of the motor phases.

6. The electric motor of claim 1 in which:

the mounting means comprise a multiplicity of housings each housing formed of heat conducting material and comprising a multiplicity of external heat-radiating fins;

each of the housings contains a different one of the stator pole assemblies of the motor phases; and, each of the housings comprises an opening through which the stator poles of the stator pole assembly contained within the housing extend.

7. The electric motor of claim 6 in which each of the housings contains a heat-conductive material surrounding the stator pole assembly contained within the housing and intimately contacting both the housing and the stator pole assembly contained within the housing.

8. The electric motor of claim 1 in which:
the stator pole assemblies of each of the motor phases are axially registered with the stator pole assemblies of each of the others of the motor phases; and, the magnetic elements of each one of the motor phases are indexed circumferentially relative to the magnetic elements of each of the others of the motor phases.

* * * * *